Jan. 23, 1951 A. METTRICK ET AL 2,538,791
JIG
Filed Nov. 29, 1945 2 Sheets-Sheet 1

INVENTORS
ARTHUR METTRICK &
DAVID HOOK.
BY M O Hayes
ATTORNEY.

Jan. 23, 1951     A. METTRICK ET AL     2,538,791
JIG
Filed Nov. 29, 1945     2 Sheets-Sheet 2
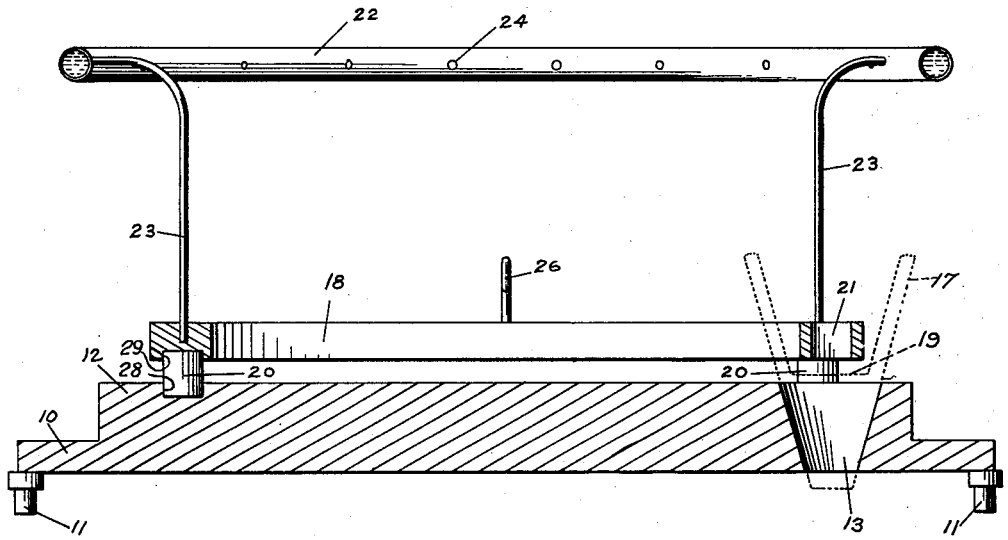
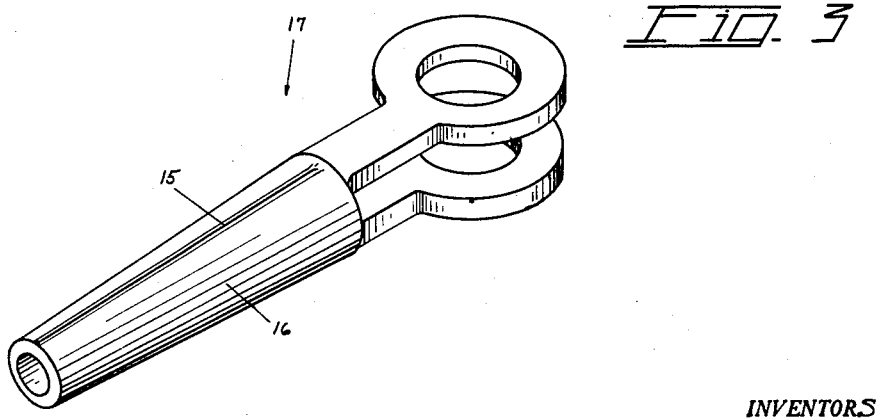
INVENTORS
ARTHUR METTRICK, &
DAVID HOOK.
BY
M. O. Hayes
ATTORNEY.

Patented Jan. 23, 1951

2,538,791

UNITED STATES PATENT OFFICE 2,538,791

JIG

Arthur Mettrick, Bellmore, and David Hook, New York, N. Y.

Application November 29, 1945, Serial No. 631,765

4 Claims. (Cl. 77—62)

(Granted under the act of March 3, 1883, as amended April 30, 1928; 370 O. G. 757)

This invention relates to jigs and more particularly to a jig for holding a plurality of like work pieces, such as clevis members, while holes are drilled or reamed in the shank portion thereof.

Clevis members have wide industrial use and are common equipment serving to terminate for further attachment wire rope, rods, poles, shafts and similarly shaped things. In our copending application Serial No. 631,467, filed November 28, 1945, now Patent Number 2,487,823 issued November 15, 1949, there is described a device for holding clevis members while holes are drilled or reamed in the jaws. The present application refers to a jig for supporting a plurality of clevis members while holes are drilled or reamed in their shanks. Since clevis members are made in great quantities, it is of considerable importance to devise means for expediting the drilling or reaming of holes in their shanks.

Previous methods of drilling and reaming the clevis shanks consisted mainly of manually strapping single clevis members to a work bench and drilling or reaming a hole in the shank portion. When jigs were used to secure a single clevis to a firm foundation prior to drilling or reaming the holes in the shank, too many steps were required to perform the operation, thus adding to the length of time and to the danger of spoiling the clevis should one of the steps be performed inaccurately.

It is an object of the present invention to provide a jig to hold rigidly a plurality of clevis members during the drilling or reaming of holes in their shanks.

Another object is to provide a jig that will allow for rapid attachment and detachment of the clevis members.

Another object is to provide a sturdy portable jig, having the aforementioned characteristics, that will include a coolant conveyor to the plurality of tools that are to drill and ream clevis members.

Further objects and advantages of this invention, as well as its construction, arrangement, and operation, will be apparent from the following description and claims in connection with the accompanying drawings, in which Fig. 1 is a plan view of an embodiment of the present invention.

Fig. 2 is a section taken along the line 2—2 of Fig. 1.

Fig. 3 is a perspective view of a clevis and shank accommodated by the present invention.

Figure 1:
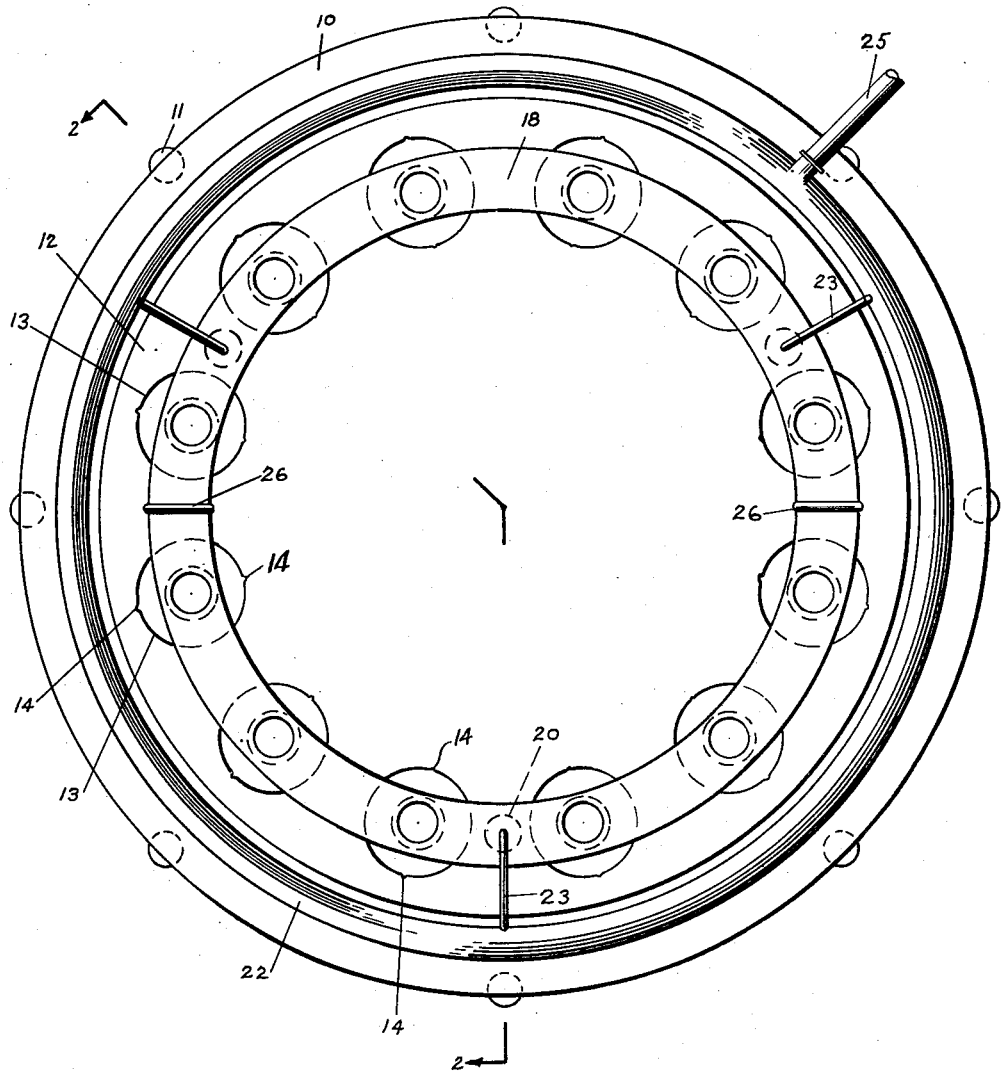

In Fig. 1 there is shown a circular member 10 having feet 11 depending therefrom, said feet 11 being of any suitable shape so as to make them readily engageable to a firm foundation yet allow for the base of said circular member 10 to lie away from contact with said firm foundation. The member 10 comprises the cylindrical member 12, extending upwardly therefrom, the member 12 having a plurality of holes 13 disposed circumferentially around the circle of the cylindrical member 12. The cavities or holes 13 are tapered to a contour for receiving clevises 17, Fig. 4.

Each hole 13 has slots 14 therein to receive the head portions 15 of the shank 16, Fig. 3, of the clevis 17 to secure the clevis 17 and prevent its rotation in the hole 13 during the drilling or reaming operation. In the case of the work piece 17 being a forging, the beads 15 can conveniently be the flash, and the slots 14 are contoured accordingly to receive and engage the flash and key the pieces 17.

The clevis 17 shown in Fig. 2 is the forging before is has been fabricated to the finished condition shown in Fig. 3. When all the pieces 17 have been positioned in the jig, a ring 18 is posioned above the base 10, 12, over the clevis members 17. Pins 20 serve to hold the ring 18 in correct circumferential relationship with the base 10, 12. Each pin 20 fits into a recess 28 in the top surface of base 10, 12, and projects upwardly into a similar recess 29 of ring 18. The pins 20 are distributed annularly of ring 18 to support the ring on the base 10, 12, and they hold the ring spaced away upwardly from the top surface of the base. Holes 21 in said ring 18 are the same in number as the holes 13 in the cylindrical member 12, the center of each hole 21 lying directly over the center of its corresponding hole 13 when the ring is held positioned on the base by the pins 20.

A second tubular ring member 22 is fixedly secured to the ring 18 by means of the stanchions or metallic posts 23. The ring 22 has holes 24 provided therein and a fluid entrant pipe 25 attached thereto to permit the use of a coolant medium to flood the tubular ring 22, the coolant being sprayed out of the ring 22 through the holes 24 in sufficient volume upon the drilling bits or reamers operating to machine the clevis shanks 16.

In order to discourage the lifting of the ring assembly out of or into its position on the fixture by gripping the tubular ring 22, which method after repeated liftings tends toward distortion, handles 26 in the form of eye hooks are diametrically disposed on the ring 18 to aid in the said positioning or removal of the ring assembly from lugs 20.

The operation of the present jig is so simple that a novice can readily use it when drilling or reaming holes or passageways in the shanks 16 after a very short period of instruction. The jig is secured to a firm foundation by inserting therein the feet 11 in suitable holes. The clevis members 17 are inserted in the holes 13, the ring assembly secured in position atop of the shank portions of the clevis members 17 as shown in Figure 1, multiple drills or reamers are secured to an appropriate supporting structure and fed towards the openings in ring 18 to drill the shanks 16, while a coolant floods the tubular ring 22 as the drilling or reaming operation is in progress.

When the sockets 17 have been drilled or reamed, the tools are raised from the work, the coolant supply shut off, the ring assembly lifted from the cylindrical member 12, the clevis members 17 removed from the jig, and a similar operation repeated for the next group.

While the number of clevis members 17 indicated in the embodiment of the device described and shown herein is twelve, any suitable number may be carried by a jig of proper design.

The size of the jig and the number of work pieces accommodated thereby may be determined by individual requirements and depends upon the number of articles to be operated upon, the size of the operating tools, the machine supporting the tools and the optimum weight of the jig.

The device described above permits rapid, simple and accurate operations on articles of the bifurcated type and also includes means incorporated in said device for showering the articles with a coolant fluid during the machining operations.

It is to be understood that various modifications and changese may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A machining jig for drilling a plurality of like work pieces comprising a circular supporting base, a plurality of cavities in the base disposed circumferentially thereof, each cavity being contoured to receive and hold a piece against rotation under drive of the drill, a ring adapted to rest on the base and comprising a drill guide for the piece of each cavity of the base, and locating means between the base and the ring orienting the ring to position the several drill guides for drilling the several pieces.

2. A machining jig for drilling a plurality of like work pieces comprising a circular supporting base, a plurality of cavities in the base disposed circumferentially thereof, each cavity being contoured to fit and seat a piece and including in its contour a keying means to engage an irregularity in the surface of the piece and hold the piece against rotation in the cavity under drive of the drill, a ring adapted to rest on the base and comprising a drill guide for each cavity of the base, and locating means between the base and the ring orienting the ring to position the several drill guides for drilling the several pieces.

3. A machining jig for drilling a plurality of like work pieces comprising a circular supporting base, a plurality of cavities in the base disposed circumferentially thereof, each cavity being contoured to receive and hold a piece against rotation under drive of the drill, a ring adapted to rest on the base and comprising a drill guide for the piece of each cavity of the base, the ring comprising handles to facilitate its positioning on and removal from the base, and locating means between the base and the ring orienting the ring to position the several drill guides for drilling the several pieces.

4. A machining jig for drilling a plurality of like work pieces comprising a circular supporting base, a plurality of cavities in the base disposed circumferentialy thereof, each cavity being contoured to receive and hold a piece against rotation under drive of the drill, a ring adapted to rest on the base and comprising a drill guide for the piece of each cavity of the base, the ring comprising handles to facilitate its positioning on and removal from the base, and locating means between the base and the ring orienting the ring to position the several drill guides for drilling the several pieces, a circumferential fluid spray attached to the ring and held supported thereby positioned to spray coolant on the work when the ring is positioned on the base.

ARTHUR METTRICK.
DAVID HOOK.

REFERENCES CITED

The following references are of record in the file of this patent:

UNITED STATES PATENTS

| Number | Name | Date |
|---|---|---|
| 817,587 | Nelson | Apr. 10, 1906 |
| 989,002 | Hanson | Apr. 11, 1911 |
| 1,547,595 | Lofland | July 28, 1925 |
| 2,076,829 | Swartz | Apr. 13, 1937 |
| 2,250,349 | Berquist | July 22, 1941 |
| 2,409,160 | Sirp | Oct. 8, 1946 |

FOREIGN PATENTS

| Number | Country | Date |
|---|---|---|
| 150,048 | Great Britain | Aug. 23, 1920 |